Patented Dec. 14, 1948

2,456,230

UNITED STATES PATENT OFFICE 2,456,230

CHROMED MONOAZO COMPOUND

Willy Widmer, Bottmingen, Switzerland, assignor to Ciba Limited, a Swiss firm

No Drawing. Application March 9, 1945, Serial No. 581,966. In Switzerland December 2, 1943

Section 1, Public Law 690, August 8, 1946
Patent expires December 2, 1963

4 Claims. (Cl. 260—151)

The present invention is concerned with complex metal compounds of azo-dyestuffs containing an ortho-amino-ortho-hydroxy-azo-grouping. More particularly the present invention is concerned with complex metal compounds of azo-dyestuffs obtained by coupling an ortho-hydroxy diazo compound with a substituted 2-aminonaphthalene as defined below.

It has previously been proposed to treat ortho-hydroxy-azo-dyestuffs obtained from 2-aminonaphthalenes as coupling components with agents yielding metal, especially with agents yielding chromium. Although some valuable complex chromium compounds have been obtained in this way the known dyestuffs of this kind are still defective in some respects, such as purity of shade. Furthermore some attractive shades of green especially on the yellowish side, could not be obtained therewith.

It is an object of the present invention to provide improved dyestuffs of the aforementioned type. Further objects will appear as the specification proceeds.

It has now been found that valuable azo-dyestuffs may be produced if ortho-hydroxy-diazo compounds are united with such 2-aminonaphthalenes capable of coupling in the 1-position which contain at least one etherified hydroxyl group and, if necessary, treating the dyestuffs thus obtained with agents yielding metal.

Ortho-hydroxy diazo compounds which come especially into consideration for the present process are diazotized 2-amino-1-phenols. These may contain further substituents, such as halogens, alkyl groups and nitro groups, and especially also sulfonic acid groups. As examples there may be mentioned 6- or 5-nitro-2-amino-1-phenol-4-sulfonic acid, 4-nitro-2-amino-1-phenol-6-sulfonic acid and 2-amino-1-phenol-4:6-disulfonic acid. The diazotization of these products is effected in known manner. The 2-aminonaphthalenes containing at least one etherified hydroxyl group which serve as azo components in the present process may contain the etherified hydroxyl group for instance in the benzene nucleus which is removed from the amino group and preferably also in the β-position, particularly in the 6-position. The 6-position appears to possess a particular importance, but the invention is not limited to this particular case. The ether group may for instance contain an alkyl radical which preferably contains not more than five carbon atoms. To this alkyl radical there may be attached further substituents having among other properties also a solubilizing character. As examples of such ether groups there may be mentioned methoxy and ethoxy, propyloxy, isopropyloxy, and butyloxy groups as well as such alkoxy groups which have still further substituents, such as ether groups or hydroxyl groups, for instance glycerine ether radicals. As azo components there come thus into consideration for example 2-amino-6-methoxy- and -6-ethoxy-naphthalene, as well as glycerine-mono-(2-amino-6-naphthyl)-ether.

The coupling in ortho-position to the amino group may be effected in a manner known in itself, for example in an acid, preferably weakly acid medium. In many cases the coupling may be accelerated by additions of various kinds, such as for instance of alcohol, pyridine or sodium acetate.

The dyestuffs thus obtained may serve for the dyeing and printing of the most various materials, such as plastic masses, lacquers, textile fibers. Acid wool dyestuffs in particular are obtained if care be taken in the choice of the components, so that at least one of the components used for the synthesis of the dyestuffs contains an acid solubilizing group, such as a sulfonic acid group.

Particularly valuable dyestuffs are obtained by causing agents yielding metal to react with the products obtained according to the above particulars, the metals having to be chosen according to the intended purpose of application. For the production of metalliferous acid wool dyestuffs use is preferably made of agents yielding chromium, particularly those which contain the chromium in a trivalent form and do not therefore exert a detrimental oxidizing action. The treatment with chromium (III) compounds may be effected in a manner known in itself, in an acid, neutral or alkaline medium, with or without addition of, for example, neutral salts, if necessary of a complex-forming nature, organic solvents, such as alcohol or pyridine, in an open vessel or under pressure. The complex metal and in particular chromium compounds of the present dyestuffs thus obtained serve with advantage for the dyeing and printing of animal fibers, such as leather, silk, and principally wool according to methods known per se.

According to the present process, dyestuffs, among others, may be obtained which dye wool in pure, especially yellowish green shades of good fastness properties and possessing a pleasing shade in artificial light.

The following examples illustrate the invention, the parts being by weight:

Example 1

23.4 parts of 6-nitro-2-amino-1-phenol-4-sulfonic acid are diazotized in known manner and coupled with 18 parts of 2-amino-6-methoxy-naphthalene in presence of acetic acid or alcohol. The filtered dyestuff of the formula

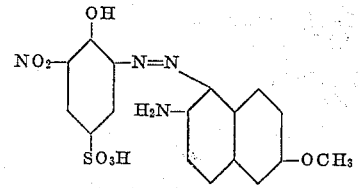

is dissolved in 1800 parts of water at boiling temperature and mixed with a solution of chromium formiate containing a quantity of chromium corresponding to 8.4 parts of chromium oxide. The whole is heated under reflux for some time at the boil, and the chromium compound thus obtained which is sparingly soluble in water is filtered off. By dissolving it in dilute caustic soda solution it is transformed into an easily soluble form. After drying it forms a grey-black powder which dissolves in water and dilute sodium carbonate solution to a greyish-green solution, and in concentrated sulfuric acid to a red-brown solution. The dyestuff dyes wool from a sulfuric acid bath uniform, pure, yellowish green tints which have a good fastness to light and fulling.

A similar dyestuff is obtained if glycerine-mono-(6-amino-2-naphthyl)-ether is used as azo component in place of 2-amino-6-methoxynaphthalene.

Example 2

23.4 parts of 4-nitro-2-amino-1-phenol-6-sulfonic acid are diazotized and coupled with 18 parts of 2-amino-6-methoxy-naphthalene in presence of pyridine. The dyestuff of the formula

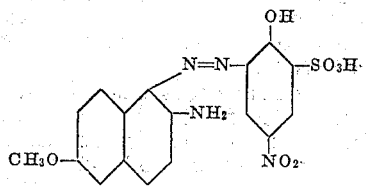

which has been filtered off is dissolved at boiling temperature in 1800 parts of water and mixed with a solution of chromium formiate which contains a quantity of chromium corresponding to 8 parts of chromium oxide. The whole is heated for some time at the boil under reflux, and the chromium compound thus obtained, which is sparingly soluble in water, is filtered off. By dissolving it in dilute caustic soda solution it is transformed into an easily soluble form, and forms after drying a blackish powder which dissolves in water and dilute sodium carbonate solution to a grey-green and in concentrated sulfuric acid to a Bordeaux-red solution. The dyestuff dyes wool from a sulfuric acid bath uniform green tints which have a good fastness to fulling and to light.

Example 3

26.9 parts of 2-amino-1-phenol-4:6-disulfonic acid are diazotized in a concentrated solution and coupled with 18 parts of 2-amino-6-methoxy-naphthalene in the presence of pyridine acetate. The filtered dyestuff of the formula

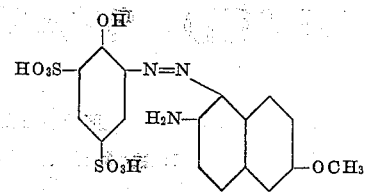

is dissolved at boiling temperature in 500 parts of water and mixed with a solution of chromium formiate, the chromium content of which corresponds to 8 parts of chromium oxide. The whole is heated under reflux for some time at the boil and the dyestuff solution thus obtained is evaporated to dryness. The dried dyestuff is a green-black powder and dissolves in water to a green, in dilute sodium carbonate solution or dilute caustic soda solution to a blue-green, and in concentrated sulfuric acid to a Bordeaux-red solution. The dyestuff dyes wool from a sulfuric acid bath pure yellowish green and uniform tints which have a good fastness to light and to fulling.

A similar dyestuff is obtained if 2-amino-6-ethoxynapthalene is used as the azo component in place of the 2-amino-6-methoxy-naphthalene.

Example 4

23.4 parts of 5-nitro-2-amino-1-phenol-4-sulfonic acid are diazotized in known manner, and coupled with 18 parts of 2-amino-6-methoxy-naphthalene in the presence of pyridine. The filtered-off dyestuff of the formula

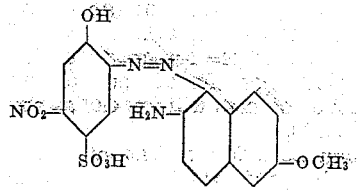

is dissolved at boiling temperature in 1500 parts of water, and mixed with a chromium formiate solution which contains a quantity of chromium corresponding to 8 parts of chromium oxide. The whole is heated under reflux for some time at the boil and the chromium compound thus obtained, which is sparingly soluble in water, is filtered off. By dissolving it in dilute caustic soda solution it is transformed into an easily soluble form. On drying it forms a green-black powder which dissolves in water and dilute sodium carbonate solution to a green, in dilute caustic soda solution to a blue-green, and in concentrated sulfuric acid to a brownish Bordeaux-red solution. The dyestuff dyes wool from a sulfuric acid bath pure green tints which have a good fastness to fulling and to light.

Example 5

100 parts of well wetted wool are introduced at 50° C. into a dye bath of 3000 parts of water which contains 4 parts of concentrated sulfuric acid, 10 parts of crystallized sodium sulfate and 0.8 part of the chromium compound obtained according to Example 1. The temperature is then raised within one hour to the boil, whereupon a further 4 parts of concentrated sulfuric acid are added, dyeing being then continued at the boil for 1½ hours. The wool is then rinsed and finished as usual. It is dyed pure yellowish green.

What I claim is:

1. A complex chromium compound of a monoazo dyestuff of the general formula

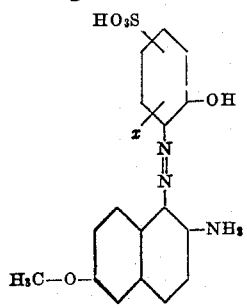

wherein $x$ stands for a member selected from the group consisting of —$SO_3H$ and —$NO_2$.

2. A complex chromium compound of the dyestuff of the formula

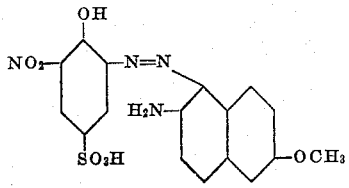

3. A complex chromium compound of the dyestuff of the formula

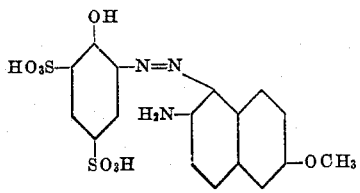

4. A complex chromium compound of the dyestuff of the formula

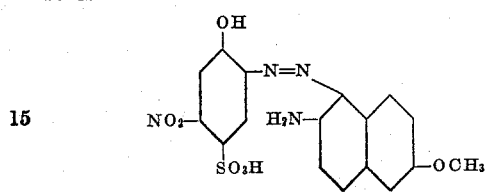

WILLY WIDMER.

REFERENCES CITED

The following references are of record in the file of this patent:

UNITED STATES PATENTS

| Number | Name | Date |
|---|---|---|
| 421,640 | Weinberg | Feb. 18, 1890 |
| 1,835,821 | Straub | Dec. 8, 1931 |
| 2,053,818 | Felix et al. | Sept. 8, 1936 |
| 2,090,432 | Straub et al. | Aug. 17, 1937 |

FOREIGN PATENTS

| Number | Country | Date |
|---|---|---|
| 500,075 | Great Britain | Feb. 2, 1939 |
| 793,459 | France | Nov. 23, 1935 |